United States Patent [19]

Nencini et al.

[11] Patent Number: 5,376,351

[45] Date of Patent: Dec. 27, 1994

[54] PROCESS FOR PREPARING CALCIUM SULPHATE

[75] Inventors: Piergiorgio Nencini; Baronti Rutilio, both of Follonica, Italy

[73] Assignee: Tioxide Group Services Limited, London, England

[21] Appl. No.: 82,105

[22] Filed: Jun. 28, 1993

[30] Foreign Application Priority Data

Jul. 1, 1992 [GB] United Kingdom ............... 9213998

[51] Int. Cl.$^5$ ..................... C01F 11/46; C09C 1/02
[52] U.S. Cl. ..................... 423/555; 423/DIG. 3; 106/464
[58] Field of Search ......... 423/555, 549, 544, DIG. 3; 106/464

[56] References Cited

FOREIGN PATENT DOCUMENTS

| | | |
|---|---|---|
| 0126050 | 11/1984 | European Pat. Off. . |
| 1467292 | 1/1969 | Germany . |
| 2702098 | 1/1977 | Germany . |
| 49-063694 | 6/1974 | Japan . |
| 51-109295 | 9/1976 | Japan . |
| 51-141793 | 12/1976 | Japan . |
| 52-011193 | 1/1977 | Japan . |
| 53-015292 | 2/1978 | Japan . |
| 53-042195 | 4/1978 | Japan . |
| 53-051199 | 5/1978 | Japan . |
| 53-052292 | 5/1978 | Japan . |
| 54-082396 | 6/1979 | Japan . |
| 54-090098 | 7/1979 | Japan . |
| 56-073628 | 6/1981 | Japan . |
| 2184520 | 7/1990 | Japan . |
| 1268723 | 3/1972 | United Kingdom . |
| 1420558 | 1/1976 | United Kingdom . |
| 1526165 | 9/1978 | United Kingdom . |

*Primary Examiner*—Ferris Lander
*Attorney, Agent, or Firm*—Baker & Botts

[57] ABSTRACT

A simple process for preparing acicular calcium sulphate dihydrate is provided in which a slurry of calcium carbonate containing 100 to 800 grams per liter calcium carbonate is mixed with a solution of sulphuric acid containing 80 to 500 grams per liter sulphuric acid in proportions which produce a calcium sulphate slurry having a pH from 0.5 to 1.5. The process can be used to neutralise by-product sulphuric acid from the preparation of titanium dioxide with crushed limestone. Preferably the calcium sulphate slurry is stirred after formation to reduce the level of unreacted carbonate. The calcium sulphate produced has an aspect ratio of at least 4:1 and has excellent properties for use in paper. The process enables the production of acicular calcium sulphate without employing special crystallisation procedures.

20 Claims, No Drawings

PROCESS FOR PREPARING CALCIUM SULPHATE

The invention relates to a process for the preparation of calcium sulphate and in particular to a process for preparing acicular crystalline calcium sulphate.

Calcium sulphate has been used as a filler in many applications including the production of paper and for this use it is desirable that the calcium sulphate has an acicular crystal habit.

Known methods for producing acicular forms of calcium sulphate include heating an aqueous suspension of calcium sulphate under pressure at a temperature above 100° C. or treatment of calcium sulphate in the presence of certain recrystallisation regulators such as alkaline hydroxides.

It is an object of this invention to provide a process for preparing an acicular form of calcium sulphate without the need to carry out special crystallisation procedures.

According to the invention a process for the production of acicular crystalline calcium sulphate dihydrate having a particle shape in which the ratio of the average longest dimension to the average shortest dimension is at least 4:1 comprises mixing an aqueous calcium carbonate slurry containing between 100 and 800 grams per liter calcium carbonate and an aqueous solution of sulphuric acid containing between 80 and 500 grams per liter sulphuric acid the quantities of the calcium carbonate and sulphuric acid being selected so as to produce a slurry of acicular calcium sulphate dihydrate having a pH between 0.5 and 1.5.

The process of the invention is simple to operate and easily adjusted to vary both the size and shape of the calcium sulphate dihydrate crystals produced.

The presence of residual carbonate moieties in the calcium sulphate product is undesirable and in a preferred embodiment of the process of the invention the content of unreacted carbonate is reduced by allowing the slurry produced to stand whilst being stirred at ambient temperature after mixing has been completed. Typically the slurry is stirred for between 0.25 and 2 hours and a final carbonate level, calculated as calcium carbonate of between 0.5 and 5% by weight based on solids is obtained. Preferably the final carbonate level is reduced to between 0.5 and 3% calculated as calcium carbonate by weight based on solids obtained.

The calcium carbonate used in the process of the invention can be any suitable calcium carbonate which is readily formed into a slurry. A convenient form of calcium carbonate is crushed limestone and, when this is used, it preferably has an average particle size between 10 and 40 microns.

A calcium sulphate having excellent properties for use in paper is produced from limestone with a brightness (L value) in the CIE 1976 L*, a*, b* colour space (Illuminant D65, observer angle 10°) of greater than 95.5 and not more than 0.5% by weight of which limestone is insoluble in hydrochloric acid.

A particularly convenient source of sulphuric acid for use in the process of the invention is the sulphuric acid arising as a by-product of the "sulphate process" for producing titanium dioxide and known as "Strong Acid Effluent". This effluent typically contains 80 to 250 grams per liter of sulphuric acid as well as from about 2 to about 60 grams per liter of soluble iron. In the process of this invention the iron largely remains in solution and calcium sulphate can readily be produced in which the iron content is less than 200 parts per million.

The concentration of the calcium carbonate slurry used in the process of the invention is between 100 and 800 grams per liter and preferably the concentration lies between 300 and 600 grams per liter.

The concentration of the sulphuric acid solution used has a major influence on the size and shape of the crystals produced. Preferably the concentration of the sulphuric acid is between 100 and 200 grams per liter and at this concentration crystals having a ratio of average longest dimension to average shortest dimension (aspect ratio) of between about 5:1 and 15:1 are produced. More preferably an acid concentration of about 120 grams per liter to about 180 grams per liter is employed and this enables the formation of crystals having a desirable aspect ratio of about 10:1.

The process can be carried out as a batchwise process or as a continuous process. In a batchwise process the slurry of calcium carbonate is preferably added to the solution of sulphuric acid whilst the resulting mixture is continually stirred. Typically, addition takes place over a period of 10 to 60 minutes and preferably the addition time is 30 to 40 minutes. If desired, the resultant slurry is left to stand to reduce the final content of carbonate moieties.

When a continuous process is used the calcium carbonate slurry and sulphuric acid solution are simultaneously fed into a stirred reactor under conditions which provide an appropriate average residence time in the reactor. Usually the average residence time is between 1 and 30 minutes. The average residence time is a factor affecting the size and aspect ratio of the crystals produced. When the sulphuric acid concentration is in the preferred range of 120 to 180 grams per liter the average residence time is preferably from about 1 to about 5 minutes.

If desired, the overflow from the continuous reactor can be left to stand in a second reactor to reduce the carbonate content of the calcium sulphate produced.

A method of agitating the reaction mixture produced during the process of the invention is employed in the batchwise and the continuous method. Conveniently, this agitation is provided by a turbine impeller agitator having a peripheral velocity between about 1 and 20 meters per second. Preferably, the peripheral velocity is from about 4 to about 15 meters per second.

The relative quantities of sulphuric acid and calcium carbonate employed are principally governed by the chosen final pH value of the calcium sulphate slurry which is between 0.5 and 1.5. Preferably the final pH value is from 1.0 to 1.5. Usually the molar ratio of sulphuric acid to calcium carbonate is between 1:1 and 1.5:1 and preferably it is between 1:1 and 1.2:1.

Usually, the calcium carbonate slurry and the sulphuric acid solution are mixed at a temperature above ambient and preferably the temperature is up to about 60° C. Most preferably it is between 45° C. and 50° C.

When the reaction and, if desired, the period of stirring to reduce carbonate content is complete the crystalline calcium sulphate produced is separated, preferably by filtration, washed and again separated, normally by filtration.

If desired, the product may be dried but a product which is suitable for use in paper can be obtained by final separation on a filter press without further drying. Typically, a product discharged from a filter press contains less than 25% by weight free water (i.e. water which is not water of crystallisation). Preferably the product contains less than 15% by weight free water.

The invention is illustrated by the following examples.

EXAMPLE 1

15 m$^3$ sulphuric acid solution containing 220 grams per liter of free H$_2$SO$_4$ was added to a 80 m$^3$ tank, stirred by a turbine impeller agitator with a peripheral velocity of 6 m/sec. The solution was diluted with water to 164 grams per liter. The temperature was adjusted to and maintained at 50° C.

A slurry containing 500 grams per liter solids was prepared from calcium carbonate with an L value of 95.53 (CIELAB colour space) and average particle size of 10 microns and was added in 40 minutes to the solution of sulphuric acid until the pH of the mixture was 0.9.

After stirring the mixture for 2 hours the pH rose to 1.5.

The resultant slurry was filtered on an horizontal membrane press filter, washed with water until the Fe content was less than 200 ppm, and pressed to obtain a filter cake which had the following analysis:

| Particle shape | 96% acicular |
| --- | --- |
| Colour | L = 95.6; a = 0.17; b = 2.73 |
| Average dimensions | 20 × 1 micron |
| Residual CaCO$_3$ % | 2.2 |
| Moisture % | 13 |
| Fe ppm | 193 |

EXAMPLE 2

50 m$^3$ sulphuric acid solution obtained as a by-product in the preparation of titanium dioxide pigment and containing 220 grams per liter of free H$_2$SO$_4$ was added to a 80 m$^3$ tank, stirred by a turbine impeller agitator with a peripheral velocity of 6 m/sec. The solution was diluted with water to 150 grams per liter. The temperature was adjusted to and maintained at 50° C.

A slurry containing 600 grams per liter solids was prepared from calcium carbonate with an L value of 95.53 (CIELAB colour space) and average particle size of 10 microns and was added in 40 minutes to the solution of sulphuric acid until the pH of the mixture was 0.9.

After stirring the mixture for 15 minutes the pH rose to 1.0.

The resultant slurry was filtered on an horizontal membrane press filter, washed with water until the Fe content was less than 200 ppm, and pressed to obtain a filter cake which had the following analysis:

| Particle shape | 96% acicular |
| --- | --- |
| Average dimensions | 10 × 1 micron |
| Residual CaCO$_3$ % | 1.0 |
| Moisture % | 25 |
| Fe ppm | 250 |

EXAMPLE 3

50 m$^3$ sulphuric acid solution obtained as a by-product in the preparation of titanium dioxide pigment and containing 220 grams per liter of free H$_2$SO$_4$ was added to a 80 m$^3$ tank, stirred by a turbine impeller agitator with a peripheral velocity of 6 m/sec. The solution was diluted with water to 110 grams per liter. The temperature was adjusted to and maintained at 50° C.

A slurry containing 400 grams per liter solids was prepared from calcium carbonate with an L value of 95.53 (CIELAB colour space) and average particle size of 10 microns and was added in 40 minutes to the solution of sulphuric acid until the pH of the mixture was 0.9.

After stirring the mixture for 15 minutes the pH rose to 1.0.

The resultant slurry was filtered on an horizontal membrane press filter, washed with water until the Fe content was less than 200 ppm, and pressed to obtain a filter cake which had the following analysis:

| Particle shape | 96% acicular |
| --- | --- |
| Average dimensions | 35 × 3 micron |
| Residual CaCO$_3$ % | 1.0 |
| Moisture % | 22 |
| Fe ppm | 193 |

EXAMPLE 4

60 $^3$m/hr of a sulphuric acid solution (by-product from titanium dioxide process) containing 164 grams per liter acid was continuously added to a 12 m$^3$ tank stirred by a turbine impeller agitator with a peripheral velocity of 12 m/sec. At the same time a slurry of calcium carbonate (500 grams per liter solids—average particle size 10 microns) was added to the tank at a rate such that the pH at the overflow was 0.9. The temperature was maintained at 50° C. The overflow from the first tank was conducted to a second tank (80 m$^3$, stirred in order to prevent sedimentation), where it was kept for a residence time of 2 hours to give a slurry of calcium sulphate containing about 2% limestone, based on calcium sulphate. From the second tank the slurry was pumped to a horizontal membrane press filter, where it was filtered, washed with water until the Fe content was less than 200 ppm and pressed to give a filter cake containing 25% moisture.

Microscopic examination showed that the crystals were mainly acicular (more than 94%), in the form of needles having average dimensions of 25×3 microns.

We claim:

1. A process for the production of acicular crystalline calcium sulphate dihydrate having a particle shape in which the ratio of the average longest dimension to the average shortest dimension is at least 4:1 comprising forming an aqueous slurry of calcium carbonate containing between 100 and 800 grams per liter calcium carbonate and an aqueous solution of sulphuric acid containing between 80 and 500 grams per liter sulphuric acid and mixing said slurry of calcium carbonate with said solution of sulphuric acid, the quantities of calcium carbonate and sulphuric acid being selected so as to produce a slurry of acicular calcium sulphate dihydrate having a pH between 0.5 and 1.5.

2. A process according to claim 1 in which the calcium carbonate is crushed limestone having a particle size between 10 microns and 40 microns.

3. A process according to claim 2 in which the limestone has a brightness in the CIE 1976 L*, a*, b* colour space of greater than 95.5 and not more than 0.5 per cent by weight of said limestone is insoluble in hydrochloric acid.

4. A process according to claim 1 in which the sulphuric acid is by-product acid from a titanium dioxide production process.

5. A process according to claim 1 in which the calcium carbonate slurry contains between 300 and 600 grams calcium carbonate per liter.

6. A process according to claim 1 in which the sulphuric acid solution has a concentration between 100 and 200 grams sulphuric acid per liter.

7. A process according to claim 6 in which the sulphuric acid concentration is from 120 to 180 grams per liter.

8. A process according to claim 1 in which the calcium sulphate dihydrate crystals produced have a ratio of average longest dimension to average shortest dimension between 5:1 and 15:1.

9. A process according to claim 1 in which the slurry of calcium carbonate is slowly added to the solution of sulphuric acid over a period of from 10 to 60 minutes whilst the resulting mixture is continually stirred.

10. A process according to claim 1 in which the calcium carbonate slurry and the sulphuric acid solution are simultaneously fed to a stirred reactor and the average residence time in the reactor is between 1 and 30 minutes.

11. A process according to claim 10 in which the sulphuric acid solution has a concentration between 120 and 180 grams sulphuric acid per liter and the average residence time is from 1 to 5 minutes.

12. A process according to claim 1 in which the slurry of calcium carbonate is mixed with the solution of sulphuric acid by stirring with a turbine impeller agitator having a peripheral velocity between 1 and 20 meters per second.

13. A process according to claim 1 in which the slurry of acicular calcium sulphate dihydrate produced has a pH of from 1.0 to 1.5.

14. A process according to claim 1 in which the calcium carbonate and sulphuric acid are mixed in a molar ratio between 1:1 and 1:1.5 calcium carbonate to sulphuric acid.

15. A process according to claim 1 in which the slurry of calcium carbonate and the solution of sulphuric acid are mixed at a temperature between 45° C. and 50° C.

16. A process according to claim 1 in which the slurry of acicular calcium sulphate produced is stirred for between 0.25 and 2 hours after mixing of the calcium carbonate and sulphuric acid is complete.

17. A process according to claim 1 in which the slurry of acicular calcium sulphate produced is stirred after mixing of the calcium carbonate and sulphuric acid is complete until unreacted carbonate is reduced to a concentration between 0.5 and 5 per cent by weight calculated as calcium carbonate based on solids.

18. A process according to claim 17 in which unreacted carbonate is reduced to between 0.5 and 3 per cent by weight calculated as calcium carbonate based on solids.

19. Acicular calcium sulphate dihydrate prepared by a process according to claim 1 and containing less than 200 parts per million iron.

20. Acicular calcium sulphate dihydrate prepared by a process according to claim 1 in the form of a filter cake containing less than 25 per cent by weight free water.

* * * * *